(12) United States Patent
Wakimoto et al.

(10) Patent No.: US 9,882,236 B2
(45) Date of Patent: Jan. 30, 2018

(54) PRISMATIC SECONDARY BATTERY

(71) Applicant: SANYO Electric Co., Ltd., Daito-shi, Osaka (JP)

(72) Inventors: Ryoichi Wakimoto, Hyogo (JP); Kazuhiro Kitaoka, Hyogo (JP); Yasuhiro Yamauchi, Hyogo (JP)

(73) Assignee: SANYO Electric Co., Ltd., Daito-shi (JP)

( * ) Notice: Subject to any disclaimer, the term of this patent is extended or adjusted under 35 U.S.C. 154(b) by 0 days.

(21) Appl. No.: 15/278,703

(22) Filed: Sep. 28, 2016

(65) Prior Publication Data
US 2017/0092980 A1    Mar. 30, 2017

(30) Foreign Application Priority Data

Sep. 29, 2015   (JP) .................................. 2015-191448

(51) Int. Cl.
| | | |
|---|---|---|
| *H01M 10/0525* | (2010.01) | |
| *H01M 2/02* | (2006.01) | |
| *H01M 2/06* | (2006.01) | |
| *H01M 4/131* | (2010.01) | |
| *H01M 4/133* | (2010.01) | |
| *H01M 4/505* | (2010.01) | |
| *H01M 4/525* | (2010.01) | |

(Continued)

(52) U.S. Cl.
CPC ....... *H01M 10/0525* (2013.01); *H01M 2/026* (2013.01); *H01M 2/0217* (2013.01); *H01M 2/0267* (2013.01); *H01M 2/06* (2013.01); *H01M 4/131* (2013.01); *H01M 4/133* (2013.01); *H01M 4/505* (2013.01); *H01M 4/525* (2013.01); *H01M 4/583* (2013.01); *H01M 4/622* (2013.01); *H01M 4/623* (2013.01); *H01M 4/625* (2013.01); *H01M 4/661* (2013.01); *H01M 4/662* (2013.01); *H01M 2220/20* (2013.01)

(58) Field of Classification Search
CPC . H01M 10/0525; H01M 2/0217; H01M 2/026
See application file for complete search history.

(56) References Cited

U.S. PATENT DOCUMENTS

| | | |
|---|---|---|
| 2009/0004561 A1 | 1/2009 | Nansaka et al. |
| 2009/0239133 A1 | 9/2009 | Kosugi |

(Continued)

FOREIGN PATENT DOCUMENTS

| | | |
|---|---|---|
| JP | 2008-226625 A | 9/2008 |
| JP | 2009-32640 A | 2/2009 |

*Primary Examiner* — Olatunji Godo
(74) *Attorney, Agent, or Firm* — Westerman, Hattori, Daniels & Adrian, LLP

(57) ABSTRACT

A prismatic secondary battery in which a deformation plate becoming deformed when a pressure inside the battery becomes equivalent to or higher than a predetermined value is disposed in a conductive path between a positive electrode plate and a positive electrode terminal, a positive electrode collector connected to the positive electrode plate includes a collector body portion, a collector connection, and a lead portion, the end portion of the lead portion on one end portion side of the sealing plate in the longitudinal direction is positioned on the one end portion side of the sealing plate in the longitudinal direction with respect to an end portion of the collector body portion on the one end portion side of the sealing plate in the longitudinal direction, the collector body portion is connected to the deformation plate, and the lead portion is connected to a positive lead portion.

6 Claims, 11 Drawing Sheets

(51) Int. Cl.
*H01M 4/583* (2010.01)
*H01M 4/62* (2006.01)
*H01M 4/66* (2006.01)

(56) References Cited

U.S. PATENT DOCUMENTS

2012/0052354 A1 3/2012 Hattori et al.
2015/0132635 A1 5/2015 Hattori et al.
2015/0303443 A1 10/2015 Yokoyama et al.

PRISMATIC SECONDARY BATTERY

CROSS REFERENCE TO RELATED APPLICATIONS

The present invention application claims priority to Japanese Patent Application No. 2015-191448 filed in the Japan Patent Office on Sep. 29, 2015, the entire contents of which are incorporated herein by reference.

BACKGROUND OF THE INVENTION

Field of the Invention
The present disclosure relates to a prismatic secondary battery.

Description of Related Art
Secondary batteries such as alkaline secondary batteries and nonaqueous electrolyte secondary batteries are used in power sources for driving electric vehicles (EV), hybrid electric vehicles (HEV, PHEV), and the like. In such applications, since a high capacity or a high input characteristic is required, a battery pack in which a plurality of prismatic secondary batteries are connected in series or in parallel is used.

In such prismatic secondary batteries, a battery case is formed by a bottomed tublar prismatic outer package including an opening and a sealing plate that seals the opening. The battery case accommodates therein an electrode body including positive electrode plates, negative electrode plates, and separators, and an electrolyte. A positive electrode terminal and a negative electrode terminal are installed in the sealing plate. The positive electrode terminal is electrically connected to the positive electrode plates through a positive electrode collector, and the negative electrode terminal is electrically connected to the negative electrode plates through a negative electrode collector.

The positive electrode plate includes a positive electrode core body made of metal and a positive electrode active material layer formed on the surface of the positive electrode core body. A positive electrode core body exposed portion, on which no positive electrode active material layer is formed, is formed in a portion of the positive electrode core body. Furthermore, the positive electrode collector is connected to the positive electrode core body exposed portion. Furthermore, the negative electrode plate includes a negative electrode core body made of metal and a negative electrode active material layer formed on the surface of the negative electrode core body. A negative electrode core body exposed portion, on which no negative electrode active material layer is formed, is formed in a portion of the negative electrode core body. Furthermore, the negative electrode collector is connected to the negative electrode core body exposed portion.

For example, Japanese Published Unexamined Patent Application No. 2009-032640 (Patent Document 1) proposes a prismatic secondary battery using a wounded electrode body including a wounded positive electrode core body exposed portion at one end portion and a wound negative electrode core body exposed portion at the other end portion. Furthermore, Japanese Published Unexamined Patent Application No. 2008-226625 (Patent Document 2) proposes a prismatic secondary battery that uses an electrode body provided with a positive electrode core body exposed portion and a negative electrode core body exposed portion at one end portion.

BRIEF SUMMARY OF THE INVENTION

Development of on-vehicle secondary batteries, particularly, secondary batteries used in EVs and PHEVs that have a higher energy density and a larger battery capacity are awaited. In the case of the prismatic secondary battery disclosed in Patent Literature 1 described above, spaces such as left and right spaces in which the wound positive electrode core body exposed portion and the wound negative electrode core body exposed portion are disposed and an upper space between the sealing plate and the wound electrode body are required in the battery case. Such a requirement is a factor hindering the increase in energy density of the second battery.

Conversely, as is the case of the prismatic secondary battery disclosed in Patent Literature 2, when the electrode body provided with the positive electrode core body exposed portion and the negative electrode core body exposed portion at one end portion is used, it will be easier to obtain a prismatic secondary battery with a high energy density.

However, development of a prismatic secondary battery that not only has a higher energy density, but that is easy to assemble and has a reliable and high current collecting structure is awaited.

An object of the present disclosure is to provide a highly reliable prismatic secondary battery that is high in energy density and capacity.

According to an aspect of the present disclosure, a prismatic secondary battery includes an electrode body that includes a positive electrode plate including a positive electrode tab portion, and a negative electrode plate including a negative electrode tab portion, an outer package that includes an opening and that houses the electrode body, a sealing plate that seals the opening, a terminal attached to the sealing plate, the terminal being electrically connected to the positive electrode plate or the negative electrode plate, a collector electrically connected to the positive electrode plate or the negative electrode plate, and a deformation plate provided in a conductive path between the positive electrode plate or the negative electrode plate and the terminal, the deformation plate being deformed when a pressure inside the battery becomes equivalent to or above a predetermined value. In the prismatic secondary battery, the collector includes a collector body portion disposed on an electrode body side of the deformation plate, a collector connection that extends from the collector body portion towards the sealing plate, and a lead portion that extends from the collector connection towards one end portion of the sealing plate in a longitudinal direction of the sealing plate, in the longitudinal direction of the sealing plate, an end portion of the lead portion on one end portion side of the sealing plate in the longitudinal direction of the sealing plate is positioned on one end portion side of the lead portion in the longitudinal direction of the sealing plate with respect to an end portion of the collector body portion on the one end portion side of the sealing plate in the longitudinal direction of the sealing plate, the collector body portion is connected to the deformation plate, the positive electrode tab portion or the negative electrode tab portion is connected to the lead portion, and the conductive path is cut off upon deformation of the deformation plate.

With the above configuration, spaces occupied by a collector portion constituted by the collector, the tab portion, and the like, and by the current breaking mechanism can be reduced such that the prismatic secondary battery becomes high in energy density. Furthermore, when connecting the collector and the tab portion to each other or upon application of an impact or vibration, a load being applied to the deformation plate, the connection of the collector, and the like can be suppressed when force that moves the electrode body in the battery case is applied; accordingly, the prismatic secondary battery becomes more reliable. Note that the one end portion of the sealing plate in the longitudinal direction of the sealing plate may be either of the two end portions of the sealing plate in the longitudinal direction. For example, in the longitudinal direction of the sealing plate, in a case in which the position where the terminal is attached to the sealing plate is shifted from the middle of the sealing plate, the one end portion in the longitudinal direction of the sealing plate can be the end portion on the far side with respect to the terminal.

Desirably, in the collector body portion, a fragile portion is formed around a connection between the collector body portion and the deformation plate, and the fragile portion is broken upon deformation of the deformation plate such that the conductive path is cut off.

Desirably, the collector includes a pair of the lead portions, and each of the lead portions is connected to the positive electrode tab portion or the negative electrode tab portion.

Desirably, a through-hole for fixing in which a length thereof is larger than a width thereof is formed in the collector body portion, the through-hole for fixing is disposed so as to extend along a border line between the collector body portion and the collector connection, a first insulating member is disposed between the deformation plate and the collector body portion, the first insulating member includes a projection for fixing, and the projection for fixing is fitted to the through-hole for fixing.

Desirably, the collector is a positive electrode collector electrically connected to the positive electrode plate, a negative electrode collector electrically connected to the negative electrode plate includes a negative electrode collector body portion disposed parallel to the sealing plate, a negative electrode collector connection extending from an end portion of the negative electrode collector body portion in a longitudinal direction of the sealing plate towards the electrode body side, and a pair of negative electrode lead portions that extend from two ends of the negative electrode collector connection towards a middle of the sealing plate in the longitudinal direction of the sealing plate, and a negative electrode tab portion is connected to each of the pair of negative electrode lead portions.

The present disclosure is capable of providing a highly reliable prismatic secondary battery that is high in energy density and capacity.

DETAILED DESCRIPTION OF THE INVENTION

Figure 1:
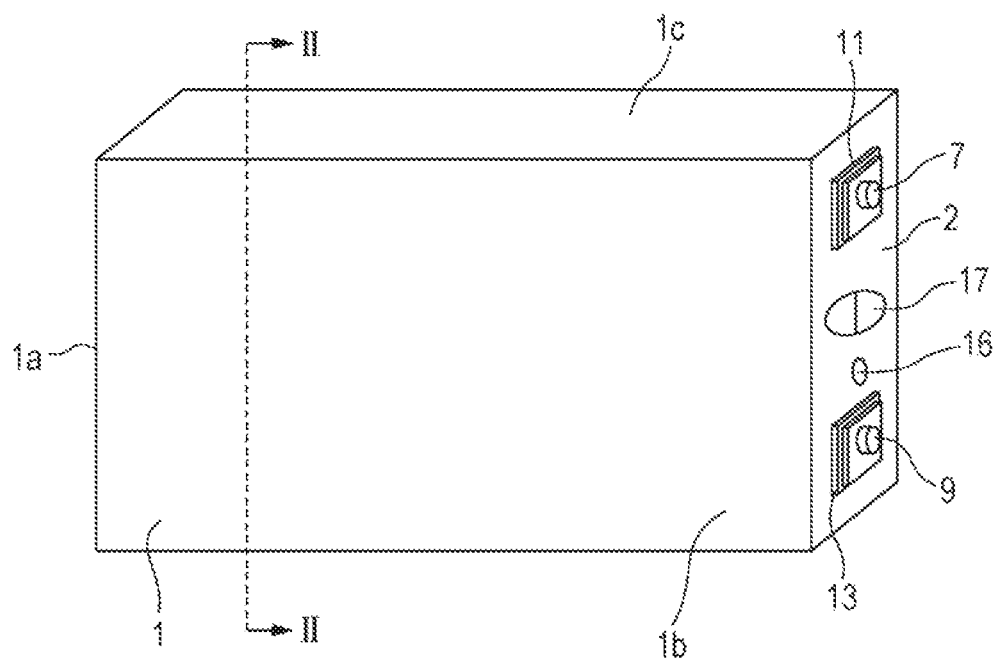
FIG. 1 is a perspective view of a prismatic secondary battery according to an exemplary embodiment.

Hereinafter, a configuration of a prismatic secondary battery 20 according to an exemplary embodiment will be described. Note that the present disclosure is not limited to the following exemplary embodiment.

As illustrated in FIGS. 1 to 6, the prismatic secondary battery 20 includes a prismatic outer package 1 that has an opening, and a sealing plate 2 that seals the opening. The prismatic outer package 1 and the sealing plate 2 are desirably made of metal and, for example, may be made of aluminum or an aluminum alloy. The prismatic outer package 1 includes a bottom 1a, a pair of large-area side walls 1b, and a pair of small-area side walls 1c. The prismatic outer package 1 is a bottomed and tublar outer package having a rectangular shape and includes the opening at a position facing the bottom 1a. A stacked electrode body 3 in which a plurality of positive electrode plates 4 and a plurality of negative electrode plates 5 are stacked with separators interposed therebetween are accommodated in the prismatic outer package 1 together with an electrolyte.

Each positive electrode plate 4 includes a positive electrode core body made of metal and a positive electrode active material layer 4a that include a positive electrode active material formed on the positive electrode core body. Each positive electrode plate 4 includes, at one of its ends, a positive electrode core body exposed portion 4b in which the positive electrode core body is exposed. Note that, desirably, an aluminum foil or an aluminum alloy foil is used for the positive electrode core body. Each negative electrode plate 5 includes a negative electrode core body made of metal and a negative electrode active material layer 5a that include a negative electrode active material formed on the negative electrode core body. Each negative electrode plate 5 includes, at one of its ends, a negative electrode core body exposed portion 5b in which the negative electrode core body is exposed. Note that, desirably, a copper foil or a copper alloy foil is used for the negative electrode core body. In the prismatic secondary battery 20, each positive electrode core body exposed portion 4b constitutes a positive electrode tab portion 4c, and each negative electrode core body exposed portion 5b constitutes a negative electrode tab portion 5c.

At an end portion of the electrode body 3 on the sealing plate 2 side, positive electrode tab portions 4c are disposed in a stacked state and the negative electrode tab portions 5c are disposed in a stacked state. A positive electrode collector 6 is connected to the stacked positive electrode tab portions 4c. Furthermore, a positive electrode terminal 7 is electrically connected to the positive electrode collector 6. A negative electrode collector 8 is connected to the stacked negative electrode tab portions 5c. Furthermore, a negative electrode terminal 9 is electrically connected to the negative electrode collector 8. A pressure-sensitive current breaking mechanism 40 is provided in the conductive path between the positive electrode plates 4 and the positive electrode terminal 7. The current breaking mechanism 40 is activated when the pressure inside the battery becomes equivalent to or higher than a predetermined value, and the current is cut off by cutting off the conductive path between the positive electrode plates 4 and the positive electrode terminal 7. Note that the pressure-sensitive current breaking mechanism 40 may be provided in the conductive path between the negative electrode plates 5 and the negative electrode terminal 9.

Figure 2:
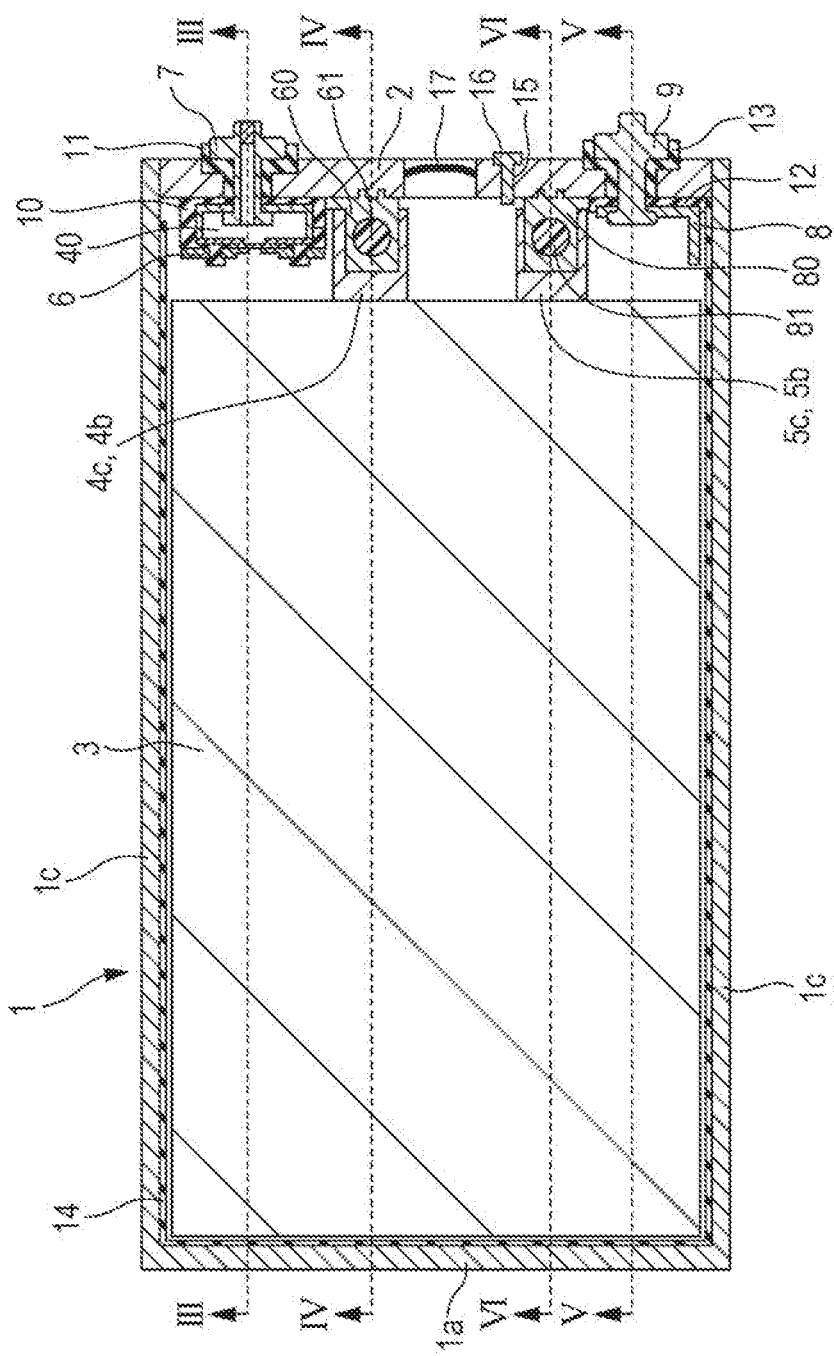
FIG. 2 is a cross-sectional view taken along line II-II in FIG. 1.
Figure 3:
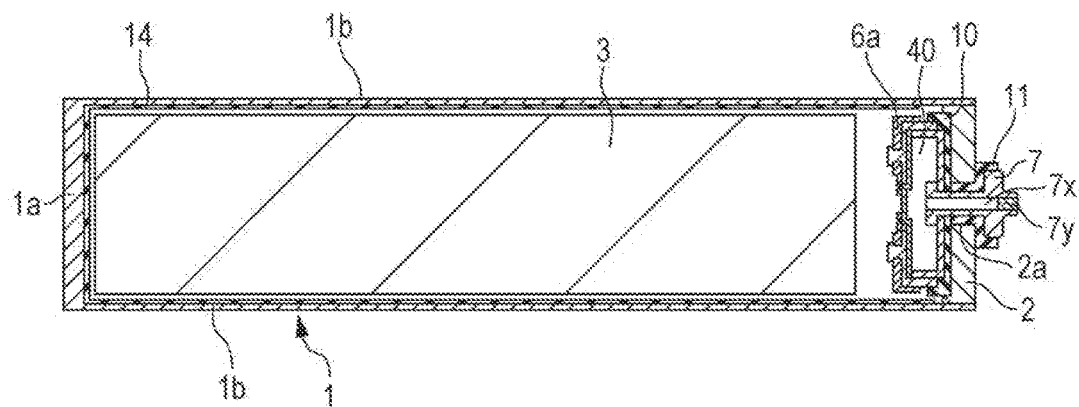
FIG. 3 is a cross-sectional view taken along line in FIG. 2.
Figure 4:
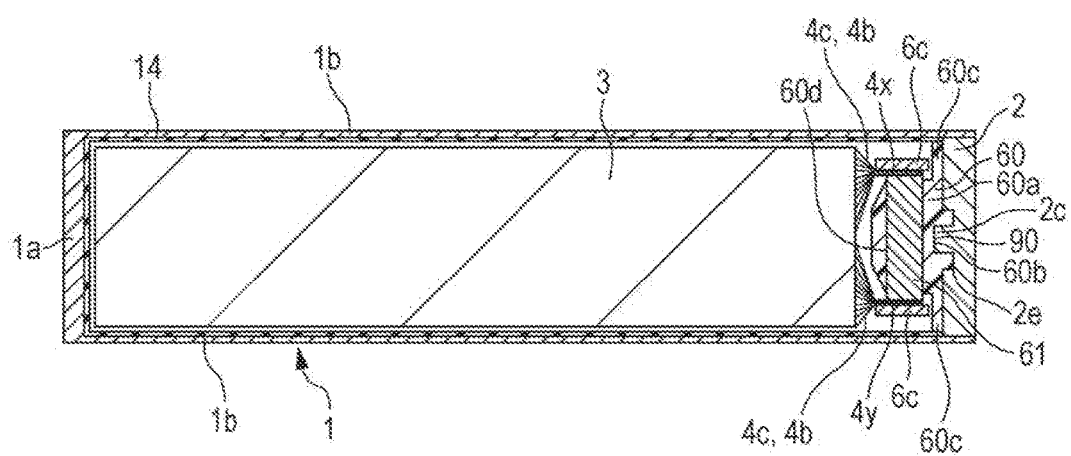
FIG. 4 is a cross-sectional view taken along line IV-IV in FIG. 2.
Figure 5:
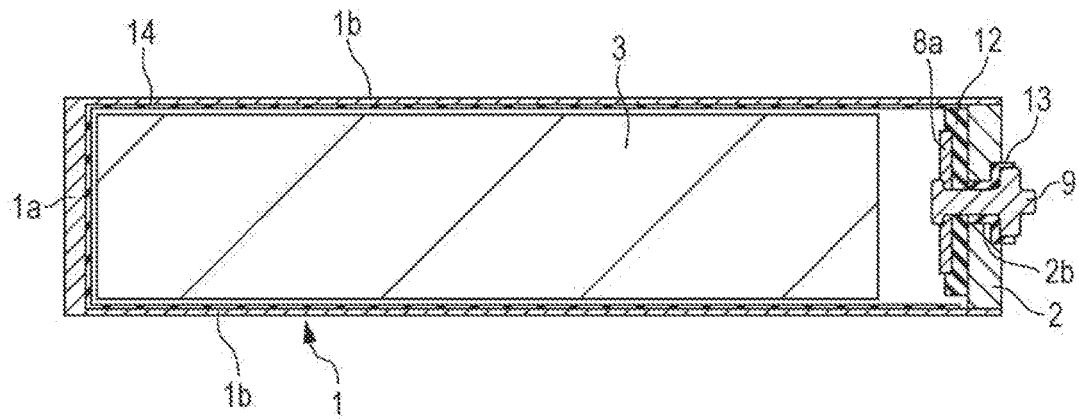
FIG. 5 is a cross-sectional view taken along line V-V in FIG. 2.

As illustrated in FIGS. 2 and 4, a resin member 60 holding a metal member 61 is connected to the battery inner surface of the sealing plate 2. The resin member 60 and the sealing plate 2 are fitted and connected to each other at a fitting portion 90. The bundled positive electrode tab portions 4c are connected to the positive electrode collector 6 while being disposed between the metal member 61 and lead portions 6c of the positive electrode collector 6. The positive electrode tab portions 4c bundled at two positions are each disposed on a corresponding one of two sides of the metal member 61 and are connected to a corresponding lead portion 6c of the pair of lead portions 6c.

Figure 6:
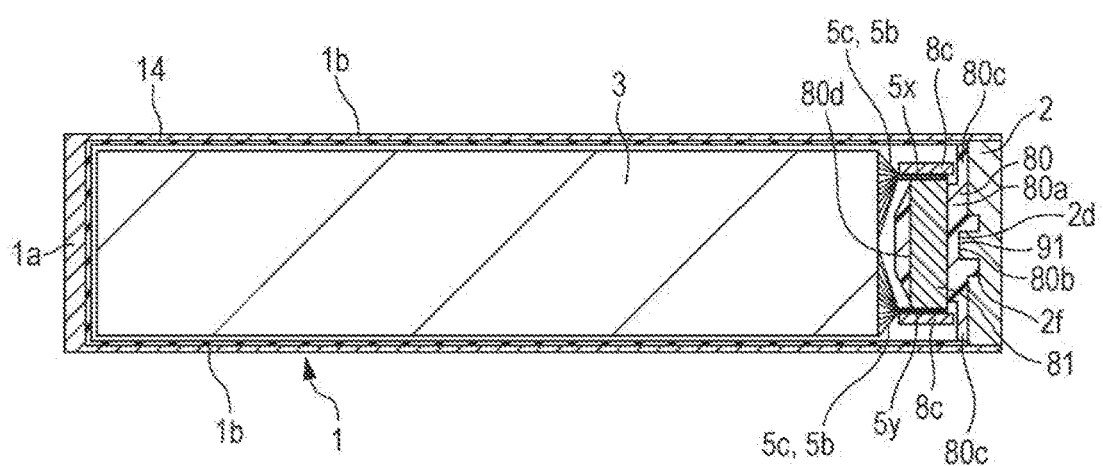
FIG. 6 is a cross-sectional view taken along line VI-VI in FIG. 2.

As illustrated in FIGS. 2 and 6, a resin member 80 holding a metal member 81 is connected to the battery inner surface of the sealing plate 2. The resin member 80 and the sealing plate 2 are fitted and connected to each other at a fitting portion 91. The bundled negative electrode tab portions 5c are connected to the negative electrode collector 8 while being disposed between the metal member 81 and lead portions 8c of the negative electrode collector 8. The negative electrode tab portions 5c bundled at two positions are each disposed on a corresponding one of two sides of the metal member 81 and are connected to a corresponding lead portion 8c of the pair of lead portions 8c.

The positive electrode terminal 7 is attached to the sealing plate 2 in an electrically insulated state with respect to the sealing plate 2 with an inner side insulating member 10 and an outer side insulating member 11. Furthermore, the negative electrode terminal 9 is attached to the sealing plate 2 in an electrically insulated state with respect to the sealing plate 2 with an inner side insulating member 12 and an outer side insulating member 13. The inner side insulating members 10 and 12 and the outer side insulating members 11 and 13 are desirably made of resin. A terminal through-hole 7x is provided in the positive electrode terminal 7, and the terminal through-hole 7x is sealed with a terminal plug 7y.

The electrode body 3 is accommodated inside the prismatic outer package 1 while being covered by an insulation sheet 14. Desirably, the insulation sheet 14 is a resin sheet folded in a box shape or a bag-shaped resin sheet. The sealing plate 2 is joined to an opening edge portion of the prismatic outer package 1 by, for example, laser welding. The sealing plate 2 includes an electrolyte injection hole 15, and the electrolyte injection hole 15 is sealed with a sealing plug 16 after injection of the electrolyte. A gas discharge valve 17 is formed in the sealing plate 2. The gas discharge valve 17 is activated when the pressure inside the battery becomes equivalent to or higher than a predetermined value and is for discharging gas inside the battery to the outside of the battery. Note that the pressure in which the gas discharge valve 17 is activated is set higher than the pressure in which the current breaking mechanism 40 is activated.

Fabrication of Positive Electrode Plate

A method for manufacturing the prismatic secondary battery 20 will be described next.

A positive electrode slurry containing lithium-nickel-cobalt-manganese composite oxide as a positive electrode active material, polyvinylidene fluoride (PVdF) as a binding agent, a carbon material as a conductive material, and N-methylpyrrolidone (NMP) is fabricated. The positive electrode slurry is coated on both surfaces of a rectangular aluminum foil that is 15 μm thick and that serves as the positive electrode core body. Subsequently, by drying the above, the N-methylpyrrolidone in the positive electrode slurry is removed and the positive electrode active material layers are formed on the positive electrode core body. Subsequently, a compression process is performed to compress the positive electrode active material layers to a predetermined thickness. The positive electrode plate obtained in the above manner is cut into a predetermined shape.

Fabrication of Negative Electrode Plate

A negative electrode slurry containing graphite as a negative electrode active material, styrene-butadiene rubber (SBR) as the binding agent, carboxymethyl cellulose (CMC) as a thickener, and water is fabricated. The negative electrode slurry is coated on both surfaces of a rectangular copper foil that is 8 μm thick and that serves as the negative electrode core body. Subsequently, by drying the above, the water in the negative electrode slurry is removed and the negative electrode active material layers are formed on the negative electrode core body. Subsequently, a compression process is performed to compress the negative electrode active material layers to a predetermined thickness. The negative electrode plate obtained in the above manner is cut into a predetermined shape.

Figure 7A:
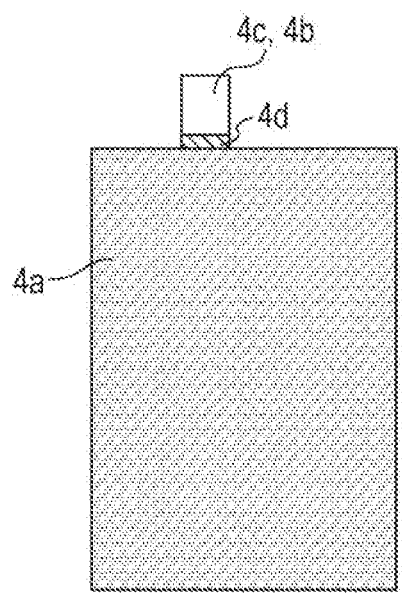
FIGS. 7A and 7B are plan views of a positive electrode plate and a negative electrode plate used in the exemplary embodiment.
Figure 7B:
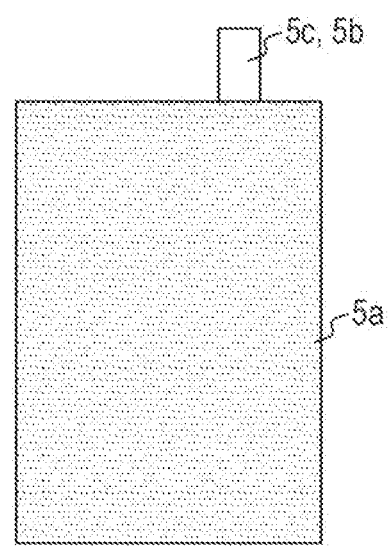

FIG. 7A is a plan view of a positive electrode plate 4 after cutting, and FIG. 7B is a plan view of a negative electrode plate 5 after cutting. The positive electrode plate 4 includes rectangular areas that are positive electrode active material layers 4a formed on both surfaces of the positive electrode core body, and the positive electrode core body exposed portion 4b serving as the positive electrode tab portion 4c is formed on one side of the positive electrode plate 4. The negative electrode plate 5 includes rectangular areas that are negative electrode active material layers 5a formed on both surfaces of the negative electrode core body, and the negative electrode core body exposed portion 5b serving as the negative electrode tab portion 5c is formed on one side of the negative electrode plate 5. Note that the size of the positive electrode plate 4 is slightly smaller than the size of the negative electrode plate 5. Desirably, an insulating layer or a protective layer 4d that has an electric resistance that is higher than that of the positive electrode core body is provided at the base portion of the positive electrode tab portion 4c. Note that conductive members other than the above may be connected to the positive electrode core body exposed portion 4b or the negative electrode core body exposed portion 5b to serve as the positive electrode tab portion 4c or the negative electrode tab portion 5c, respectively.

Fabrication of Stacked Electrode Body

Figure 8:
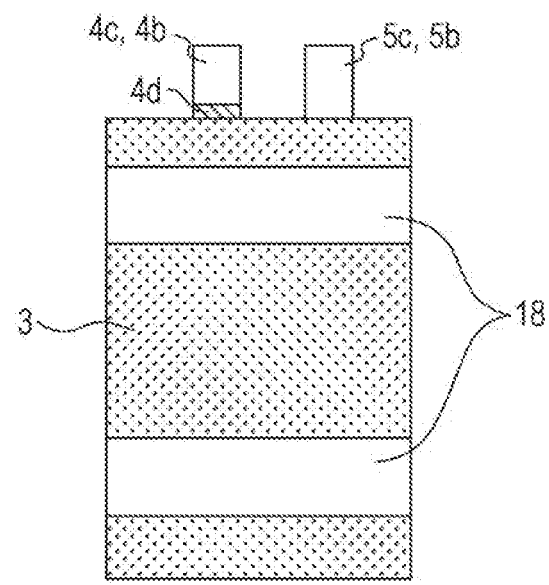
FIG. 8 is a plan view of a stacked electrode body used in the exemplary embodiment.

The stacked electrode body 3 is fabricated by fabricating 100 pieces of positive electrode plates 4 and 101 pieces of negative electrode plates 5 with the above methods and by stacking each positive electrode plate 4 and each negative electrode plate 5 on each other with a rectangular polyolefin separator therebetween. As illustrated in FIG. 8, the stacked electrode body 3 is fabricated such that the positive electrode tab portions 4c of the positive electrode plates 4 and the negative electrode tab portions 5c of the negative electrode plates 5 are stacked at one end portion of the electrode body 3. Desirably, separators are disposed on both outer surfaces of the stacked electrode body 3 and the electrode plates and the separators are fixed with tapes 18 and the like in a stacked state. Alternatively, an adhesion layer may be provided on each separator such that the separators and the positive electrode plates 4, and the separators and the negative electrode plates 5 are adhered to each other. Note that the size of the separator in plan view is the same or larger than the size of the negative electrode plate 5. Each positive electrode plate 4 may be disposed between two separators and after heat welding the outer peripherals of the separators, each of the positive electrode plates 4 and each of the negative electrode plates 5 may be stacked on each other.

Figure 9:
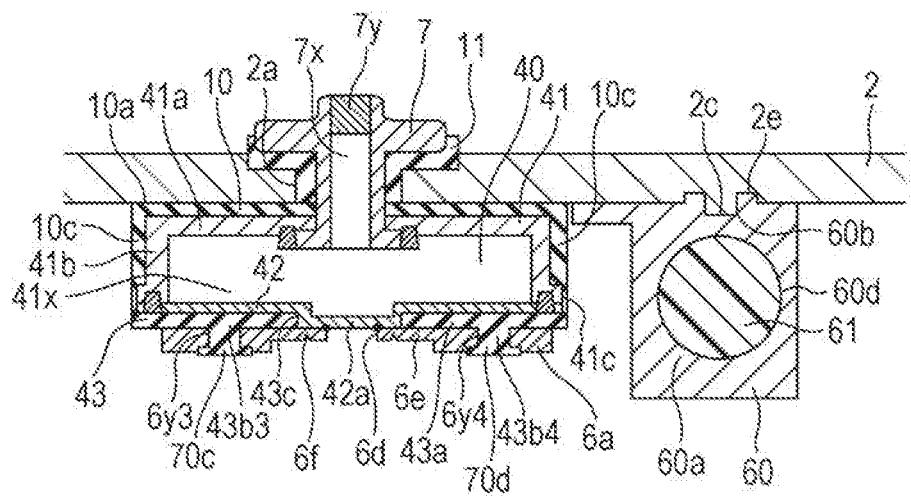
FIG. 9 is a cross-sectional view of a portion in the vicinity of a current breaking mechanism in a longitudinal direction of the sealing plate.
Figure 10:
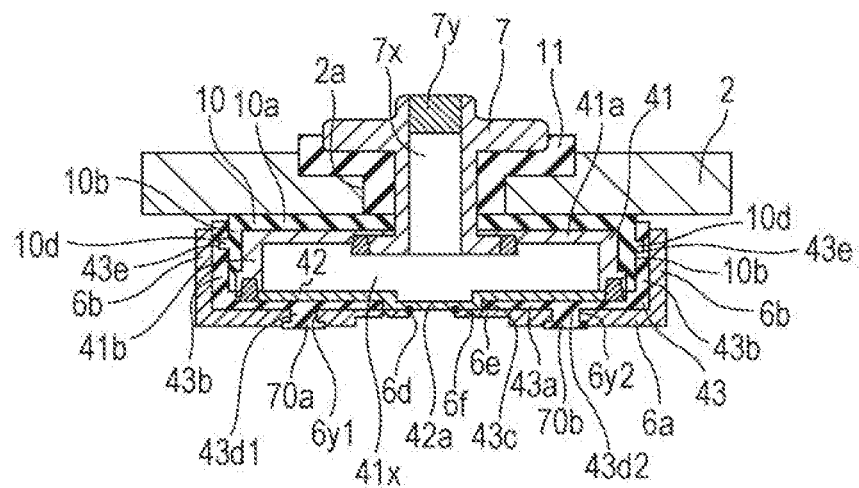
FIG. 10 is a cross-sectional view of a portion in the vicinity of the current breaking mechanism in a short direction of the sealing plate.

Attaching Positive Electrode Terminal and Current Breaking Mechanism to Sealing Plate FIG. 9 is a cross-sectional view of a portion in the vicinity of the current breaking mechanism 40 in the longitudinal direction of the sealing plate 2. FIG. 10 is a cross-sectional view of a portion in the vicinity of the current breaking mechanism 40 in the short direction of the sealing plate 2.

A positive electrode terminal mounting hole 2a serving as a through-hole is formed in the sealing plate 2. The outer side insulating member 11 is disposed on the battery outer surface side of the positive electrode terminal mounting hole 2a, and the inner side insulating member 10 and a conductive member 41 are disposed on the battery inner surface side. Furthermore, the positive electrode terminal 7 is inserted from the outer side of the battery through the through-holes formed in the outer side insulating member 11, the sealing plate 2, the inner side insulating member 10, and the conductive member 41, and the tip of the positive electrode terminal 7 is riveted on the conductive member 41. Note that the riveted portion of the tip of the positive electrode terminal 7 is, desirably, further welded to the conductive member 41.

Desirably, the conductive member 41 has a cup-shape that includes an opening portion 41x open towards the electrode body 3 side. The conductive member 41 includes a base portion 41a that is disposed parallel to the sealing plate 2, and a cylindrical portion 41b that extends from the base portion 41a towards the electrode body 3 side. The cylindrical portion 41b may have a cylindrical shape or may be a rectangular tubular portion. The conductive member 41 is made of metal and, desirably, is made of aluminum or an aluminum alloy. The positive electrode terminal 7 is connected to the base portion 41a. Note that the positive electrode terminal 7 and the conductive member 41 may be an integral component. In such a case, the positive electrode terminal 7 is inserted into the through-holes of the components from the inner side of the battery and is riveted on the outer side of the battery.

The inner side insulating member 10 includes an insulating member body portion 10a disposed between the sealing plate 2 and the base portion 41a of the conductive member 41, a pair of insulating member first side walls 10b that extend from the two end portions of the insulating member body portion 10a in the short direction of the sealing plate 2 towards the electrode body 3 side, and a pair of insulating member second side walls 10c that extend from the two end portions of the insulating member body portion 10a in the longitudinal direction of the sealing plate 2 towards the electrode body 3 side. A protrusion 10d is formed on the outer surface of each insulating member first side wall 10b.

Subsequently, a deformation plate 42 is disposed so as to close the opening portion 41x of the conductive member 41 on the electrode body 3 side, and the outer peripheral edge of the deformation plate 42 is joined to the conductive member 41 by laser welding or the like. With the above, the opening portion 41x of the conductive member 41 on the electrode body 3 side is sealed in an airtight manner. The deformation plate 42 is made of metal and, desirably, is made of aluminum or an aluminum alloy. The shape of the deformation plate 42 is desirably the same as that of the opening portion 41x of the conductive member 41. In the prismatic secondary battery 20, the deformation plate 42 has a circular shape in plan view.

Subsequently, a dielectric plate 43 serving as a first insulating member is disposed on the surface of the deformation plate 42 on the electrode body 3 side. The dielectric plate 43 includes a dielectric plate body portion 43a disposed between the deformation plate 42 and a collector body portion 6a of the positive electrode collector 6, and a pair of dielectric plate first side walls 43b that extend from two edge portions of the dielectric plate body portion 43a in a short direction of the sealing plate 2 towards the sealing plate 2 side. A dielectric plate through-hole 43c, a first projection 43d1, a second projection 43d2, a third projection 43d3, and a fourth projection 43d4 are formed in the dielectric plate body portion 43a. Furthermore, recesses 43e are formed on the inner surface of the dielectric plate first side walls 43b.

A projection 42a formed in the middle portion of the deformation plate 42 is inserted into the dielectric plate through-hole 43c formed in the dielectric plate body portion 43a. Furthermore, the inner surfaces of the dielectric plate first side walls 43b are disposed so as to face the outer surfaces of the insulating member first side walls 10b. Furthermore, by fitting the protrusions 10c and the recesses 43e to each other, the insulating member 10 and the dielectric plate 43 are connected to each other. Note that the recesses 43e may be through-holes.

Flange portions 41c are provided on the end portions of the conductive member 41 on the electrode body 3 side. Furthermore, hooking and fixing portions that can be hooked to the flange portions 41c of the conductive member 41 are desirably provided on the surface of the dielectric plate body portion 43a on the sealing plate 2 side. With the above, the dielectric plate 43 is fixed to the conductive member 41.

Positive Electrode Collector

Figure 11:
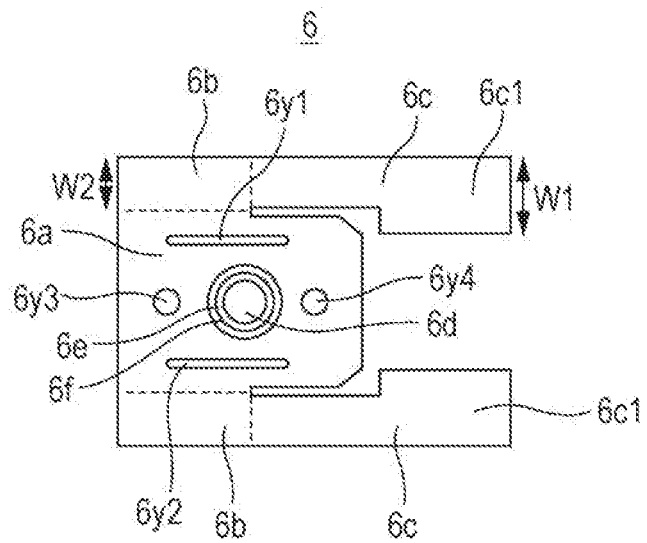
FIG. 11 is a plan view of a positive electrode collector before bending used in the exemplary embodiment.

A configuration of the positive electrode collector 6 will be described herein. FIG. 11 is a plan view of the positive electrode collector 6 before bending, and illustrates a surface thereof on the electrode body 3 side. The positive electrode collector 6 includes a collector body portion 6a, a pair of collector connections 6b provided at the two ends (the two ends in the short direction of the sealing plate 2) of the collector body portion 6a, and a pair of lead portions 6c that are each provided in the corresponding collector connection 6b. As illustrated in FIG. 10, the collector connections 6b are bent with respect to the collector body portion 6a so as to extend from the collector body portion 6a towards the sealing plate 2. Note that a wide-width portion 6c1 that has a width (W1) that is wider than a width (W2) of the collector connection 6b is provided at a distal end side of each lead portion 6c.

A through-hole 6d for connection is formed in the collector body portion 6a, and a thin wall portion 6e is formed around the through-hole 6d for connection. Furthermore, an annular groove portion 6f is provided inside the thin wall portion 6e so as to surround the through-hole 6d for connection. The thickness (the residual thickness) of the groove portion 6f is smaller than that of the thin wall portion 6e. Note that the annual groove portion 6f is a fragile portion and is broken upon deformation of the deformation plate 42. In other words, the fragile portion is the portion to be broken. Note that since it is only sufficient that the conductive path is cut off upon breakage of the fragile portion, both of the thin wall portion 6e and the groove portion 6f do not have to be provided. Only the thin wall portion 6e or only the groove portion 6f may be provided. Alternatively, the connection between the deformation plate 42 and the collector body portion 6a may be a fragile portion without providing the thin wall portion 6e or the groove portion 6f. Alternatively, the fragile portion, such as the thin wall portion or a groove portion, may be provided in the deformation plate 42.

A first through-hole 6y1 for fixing, a second through-hole 6y2 for fixing, a third through-hole 6y3 for fixing, and a fourth through-hole 6y4 for fixing are provided in the collector body portion 6a. The first through-hole 6y1 for fixing and the second through-hole 6y2 for fixing have an elongated shape extending along boundary lines of the collector body portion 6a and the collector connections 6b. The first through-hole 6y1 for fixing and the second through-hole 6y2 for fixing are disposed between the through-hole 6d for connection and the boundary lines between the collector body portion 6a and the collector connections 6b. The first through-hole 6y1 for fixing and the second through-hole 6y2 for fixing have, desirably, a rectangular shape, an elliptic shape, a track shape, or the like.

The third through-hole 6y3 for fixing and the fourth through-hole 6y4 for fixing each have a round shape. The third through-hole 6y3 for fixing and the fourth through-hole 6y4 for fixing are disposed on both sides of the through-hole 6d for connection. Furthermore, the third through-hole 6y3 for fixing and the fourth through-hole 6y4 for fixing are disposed on a line that passes through the through-hole 6d for connection and that is parallel to the boundary lines between the collector body portion 6a and the collector connections 6b.

Attaching Positive Electrode Collector

Such a positive electrode collector 6 is disposed on the surface of the dielectric plate 43 on the electrode body 3 side. In so doing, the first projection 43d1, the second projection 43d2, the third projection 43d3, and the fourth projection 43d4 formed in the dielectric plate 43 are respectively inserted into the first through-hole 6y1 for fixing, the second through-hole 6y2 for fixing, the third through-hole 6y3 for fixing, and the fourth through-hole 6y4 for fixing formed in the positive electrode collector 6. The first projection 43d1 and the second projection 43d2 have shapes that correspond to the shapes of the first through-hole 6y1 for fixing and the second through-hole 6y2 for fixing, respectively. Subsequently, by expanding the diameters of the tips of the first projection 43d1, the second projection 43d2, the third projection 43d3, and the fourth projection 43d4, the positive electrode collector 6 is fixed to the dielectric plate 43. With the above, a first fixed portion 70a, a second fixed portion 70b, a third fixed portion 70c, and a fourth fixed portion 70d are formed. Note that the projections may be press-fitted into the through-holes for fixing.

Gas is sent in through the terminal through-hole 7x formed in the positive electrode terminal 7 from the outer side of the battery, such that the deformation plate 42 is urged against the collector body portion 6a of the positive electrode collector 6. In the above state, the edge portion of the through-hole 6d for connection provided in the collector body portion 6a of the positive electrode collector 6 and the deformation plate 42 are joined together by laser welding or the like. Note that the through-hole 6d for connection is not an essential configuration and a collector body portion 6a that has no through-hole 6d for connection may be joined to the deformation plate 42. The terminal through-hole 7x is sealed with the terminal plug 7y.

The positive electrode collector 6 to which bending has been performed in advance may be connected to the dielectric plate 43 and the deformation plate 42. Alternatively, bending may be performed on the positive electrode collector 6 after the positive electrode collector 6 has been connected to the dielectric plate 43 and the deformation plate 42.

Attaching Negative Electrode Terminal to Sealing Plate

Negative Electrode Collector

Figure 12:
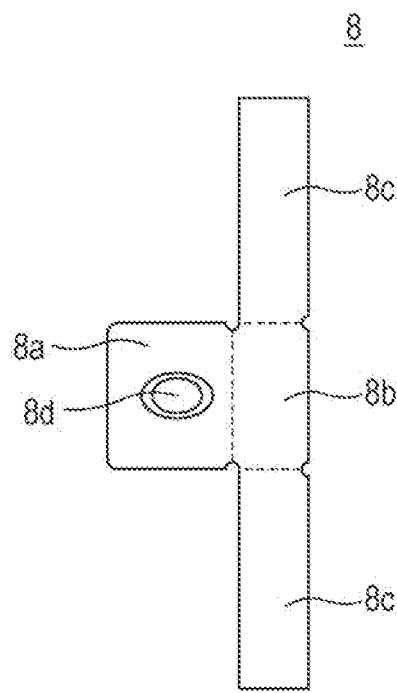
FIG. 12 is a plan view of a negative electrode collector before bending used in the exemplary embodiment.

A configuration of the negative electrode collector 8 will be described. FIG. 12 is a plan view of the negative electrode collector 8 before bending, and illustrates a surface thereof on the electrode body 3 side. The negative electrode collector 8 includes a collector body portion 8a, a collector connection 8b provided at the end (the end in the longitudinal direction of the sealing plate 2) of the collector body portion 8a, and a pair of lead portions 8c that extend from the two edge portions of the collector connection 8b in the short direction of the sealing plate 2. The collector connection 8b is bent with respect to the collector body portion 8a so as to extend from the collector body portion 8a towards the electrode body 3. A through-hole 8d into which the negative electrode terminal 9 is inserted is provided in the collector body portion 8a.

A negative electrode terminal mounting hole 2b serving as a through-hole is formed in the sealing plate 2. The outer side insulating member 13 is disposed on the outer surface side of the negative electrode terminal mounting hole 2b, and the inner side insulating member 12 and the collector body portion 8a of the negative electrode collector 8 are disposed on the inner surface side. Furthermore, the negative electrode terminal 9 is inserted from the outer side of the battery through the through-holes formed in the outer side insulating member 13, the sealing plate 2, the inner side insulating member 12, and collector body portion 8a of the negative electrode collector 8, and the tip of the negative electrode terminal 9 is riveted on the negative electrode collector 8. Furthermore, the riveted portion of the negative electrode terminal 9 is welded to the negative electrode collector 8.

Subsequently, bending is performed on the negative electrode collector 8 such that the pair of lead portions 8c and the pair of collector connections 8b are substantially perpendicular to the collector body portion 8a. Note that the negative electrode collector 8 may be connected to the negative electrode terminal 9 after bending has been performed on the negative electrode collector 8.

Attaching Metal Member and Resin Member to Sealing Plate

A first fitting protrusion 2c and a second fitting protrusion 2d are provided in the surface of the sealing plate 2 on the inner side of the battery. A first base end recess 2e is provided around a base end of the first fitting protrusion 2c, and a second base end recess 2f is provided around a base end of the second fitting protrusion 2d. The first fitting protrusion 2c is disposed between the positive electrode terminal mounting hole 2a and the gas discharge valve 17, and the second fitting protrusion 2d is disposed between the negative electrode terminal mounting hole 2b and the gas discharge valve 17.

The resin member 60 includes a holding portion 60a that holds the metal member 61, and a fitting recess 60b into which the first fitting protrusion 2c of the sealing plate 2 is fitted. The holding portion 60a includes a holding through-hole 60d that extends in the short direction of the sealing plate 2. The metal member 61 has a columnar shape and is disposed inside the holding through-hole 60d provided in the holding portion 60a.

The resin member 80 includes a holding portion 80a that holds the metal member 81, and a fitting recess 80b into which the second fitting protrusion 2d of the sealing plate 2 is fitted. The holding portion 80a includes a holding through-hole 80d that extends in the short direction of the sealing plate 2. The metal member 81 has a columnar shape and is disposed inside the holding through-hole 80d provided in the holding portion 80a. Note that the metal members 61 and 81 are desirably, pillar shaped and are, desirably, columnar or prismatic.

The resin member 60 is connected to the sealing plate 2 by fitting the first fitting protrusion 2c of the sealing plate 2 to the fitting recess 60b of the resin member 60 holding the metal member 61. With the above, the fitting portion 90 is formed. Furthermore, the resin member 80 is connected to the sealing plate 2 by fitting the second fitting protrusion 2d of the sealing plate 2 to the fitting recess 80b of the resin member 80 holding the metal member 81. With the above, the fitting portion 91 is formed. Desirably, the shapes of the first fitting protrusion 2c and the second fitting protrusion 2d in plan view are each elliptical, oval, rectangular, or a rectangle with rounded corners. With the above, rotation of the resin member 60 or the resin member 80 with respect to the sealing plate 2 can be prevented.

As illustrated in FIG. 4, the resin member 60 includes a contact preventing portion 60c disposed between the lead portions 6c of the positive electrode collector 6 and the sealing plate 2. Furthermore, as illustrated in FIG. 6, the resin member 80 includes a contact preventing portion 80c disposed between the lead portions 8c of the negative electrode collector 8 and the sealing plate 2. The contact preventing portion 60c or the contact preventing portion 80c reliably prevents the positive electrode collector 6 or the negative electrode collector 8 from coming in contact with the sealing plate 2.

A thickness of the contact preventing portion 60c is smaller than a thickness of the holding portion 60a in the direction perpendicular to the sealing plate 2. Furthermore, the contact preventing portion 60c is disposed so as to extend towards the large-area side walls 1b of the prismatic outer package 1 from the holding portion 60a.

Figure 13:
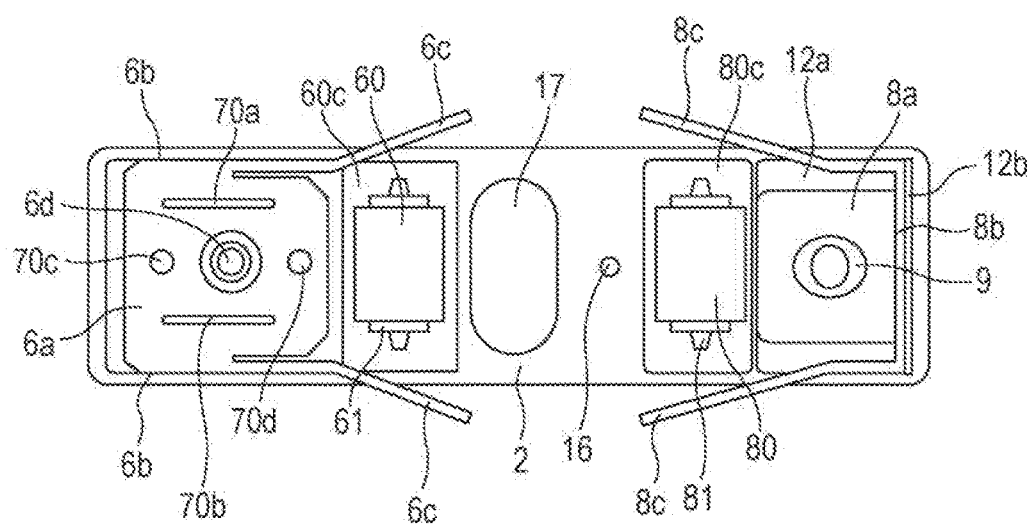
FIG. 13 is a diagram illustrating a surface of a sealing plate on an inner side of the battery in which the positive electrode collector and the negative electrode collector have been installed.
Figure 14:
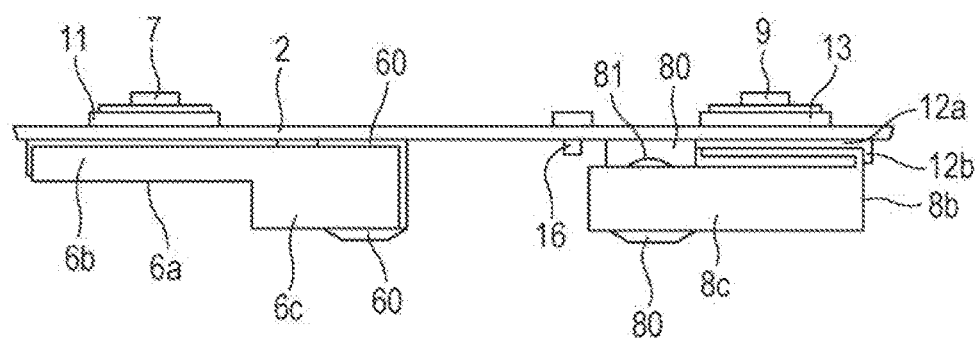
FIG. 14 is a side view of a sealing plate in which the positive electrode collector and the negative electrode collector have been installed.

FIG. 13 is a diagram illustrating the surface of the sealing plate 2 on the inner side of the battery to which the positive electrode collector 6, the negative electrode collector 8, the resin member 60 holding the metal member 61, and the resin member 80 holding the metal member 81 are attached. FIG. 14 is a diagram illustrating a side view of the sealing plate 2 to which the positive electrode collector 6, the negative electrode collector 8, the resin member 60 holding the metal member 61, and the resin member 80 holding the metal member 81 are attached. Similar to the resin member 60, the resin member 80 includes the contact preventing portion 80c and the holding through-hole 80d. As illustrated in FIG. 14, the inner side insulating member 12 includes a portion 12a disposed between the sealing plate 2 and the collector body portion 8a, and a vertical wall 12b disposed on the outer surface of the collector connection 8b.

Connecting Positive Electrode Tab Portions and Positive Electrode Collector to Each Other A plurality of positive electrode tab portions 4c are bundled at two positions forming a first positive electrode tab group 4x and a second positive electrode tab group 4y. Note that in the first positive electrode tab group 4x and the second positive electrode tab group 4y, since the positive electrode tab portions 4c are fixed to each other, desirably, the positive electrode tab portions 4c are joined to each other by welding. Alternatively, since the positive electrode tab portions 4c are fixed to each other, desirably, the positive electrode tab portions 4c are fixed to each other with a bundling component. For example, a metal or resin bundling component may fix the bundled positive electrode tab portions 4c while penetrating through the bundled positive electrode tab portions 4c.

The first positive electrode tab group 4x is disposed between first lead portions 6c of the positive electrode collector 6 and the metal member 61. Furthermore, the second positive electrode tab group 4y is disposed between second lead portions 6c of the positive electrode collector 6 and the metal member 61. Subsequently, a pair of resistance welding electrodes are disposed on an outer surface side of the first lead portions 6c and an outer surface side of the second lead portions 6c. Subsequently, resistance welding is performed while the pair of resistance welding electrodes hold the first lead portions 6c, the first positive electrode tab group 4x, the metal member 61, the second positive electrode tab group 4y, and the second lead portions 6c in between. With the above, the first lead portions 6c and the first positive electrode tab group 4x are welded to each other, and the second lead portions 6c and the second positive electrode tab group 4y are welded to each other. In so doing, desirably, the first positive electrode tab group 4x and the second positive electrode tab group 4y are each welded to the metal member 61.

Note that before the first positive electrode tab group 4x and the second positive electrode tab group 4y are disposed between the pair of lead portions 6c of the positive electrode collector 6 and the metal member 61, as illustrated in FIG. 13, the positive electrode collector 6 is, desirably, unfolded so that the distal ends of the pair of lead portions 6c are spread outwards. Referring to FIG. 13, bending is performed on the positive electrode collector 6 such that the distance between the pair of lead portions 6c is larger than the distance between the pair of collector connections 6b.

Connecting Negative Electrode Tab Portions and Negative Electrode Collector to Each Other A plurality of negative electrode tab portions 5c are bundled at two positions forming the first negative electrode tab group 5x and the second negative electrode tab group 5y. Note that similar to the first positive electrode tab group 4x and the second positive electrode tab group 4y, the negative electrode tab portions 5c may be fixed to each other in the first negative electrode tab group 5x and the second negative electrode tab group 5y. The first negative electrode tab group 5x is disposed between first lead portions 8c of the negative electrode collector 8 and the metal member 81. Furthermore, the second negative electrode tab group 5y is disposed between second lead portions 8c of the negative electrode collector 8 and the metal member 81. Subsequently, a pair of resistance welding electrodes are disposed on an outer surface side of the first lead portions 8c and an outer surface side of the second lead portions 8c. Subsequently, resistance welding is performed while the pair of resistance welding electrodes hold the first lead portions 8c, the first negative electrode tab group 5x, the metal member 81, the second negative electrode tab group 5y, and the second lead portions 8c in between. With the above, the first lead portions 8c and the first negative electrode tab group 5x are welded to each other, and the second lead portions 8c and the second negative electrode tab group 5y are welded to each other. In so doing, desirably, the first negative electrode tab group 5x and the second negative electrode tab group 5y are each welded to the metal member 81.

Similar to the positive electrode side, before the first negative electrode tab group 5x and the second negative electrode tab group 5y are disposed between the lead portions 8c of the negative electrode collector 8 and the metal member 81, the negative electrode collector 8 is, desirably, unfolded so that the distal ends of the pair of lead portions 8c are spread outwards.

Figure 15:
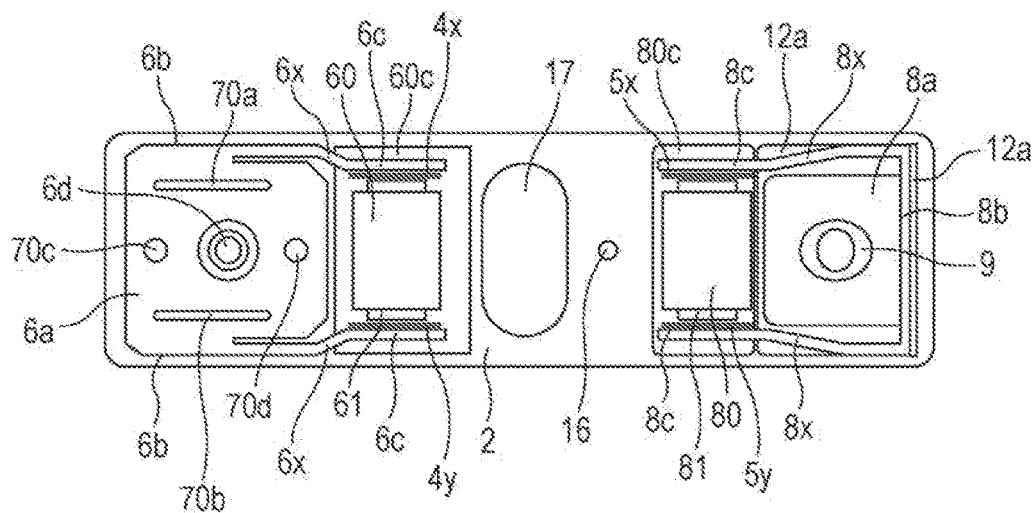
FIG. 15 illustrates the surface of the sealing plate on the inner side of the battery after positive electrode tab portions have been installed in the positive electrode collector, and negative electrode tab portions have been installed in the negative electrode collector.

FIG. 15 illustrates the surface of the sealing plate on the inner side of the battery after the positive electrode tab portions 4c have been installed in the positive electrode collector 6, and the negative electrode tab portions 5c have been installed in the negative electrode collector 8.

Assembling Prismatic Secondary Battery

The electrode body 3 that is connected to the sealing plate 2 is covered with the insulation sheet 14 and is inserted into the prismatic outer package 1. Subsequently, the sealing plate 2 and the prismatic outer package 1 is joined together by laser welding or the like and the opening of the prismatic outer package 1 is sealed. After the above, nonaqueous electrolyte containing an electrolyte solvent and electrolyte salt is injected through the electrolyte injection hole 15 provided in the sealing plate 2. Subsequently, the electrolyte injection hole 15 is sealed with the sealing plug 16.

Prismatic Secondary Battery

As illustrated in FIG. 10, in the positive electrode collector 6, the collector body portion 6a is disposed on the electrode body 3 side of the deformation plate 42. Furthermore, the pair of collector connections 6b extend towards the sealing plate 2 from the two end portions of the collector body portion 6a in the short direction of the sealing plate 2. The pair of collector connections 6b are each disposed between the conductive member 41 and the corresponding large-area side wall 1b of the prismatic outer package 1. Each lead portion 6c of the positive electrode collector 6 extends from the corresponding collector connection 6b towards, among the two end portions of the sealing plate 2 in the longitudinal direction, the end portion that is on the far side with respect to the positive electrode terminal 7 (the end portion on the right side in FIG. 15). Furthermore, in the longitudinal direction of the sealing plate 2, with respect to the collector body portion 6a, each lead portion 6c extends to a portion, among the two end portions of the sealing plate 2 in the longitudinal direction, on the end portion side, which is on the far side with respect to the positive electrode terminal 7 (the end portion on the right side in FIG. 15). In other words, in the longitudinal direction of the sealing plate 2, the end portion of each lead portion 6c on one of the end portions side of the sealing plate 2 in the longitudinal direction is positioned on the one of the end portions side of the sealing plate 2 in the longitudinal direction with respect to an end portion of the collector body portion 6a on the one of the end portions side of the sealing plate 2 in the longitudinal direction. With such a configuration, the space occupied by the collector portion in the battery case can be made smaller and the prismatic secondary battery becomes higher in energy density. Furthermore, when connecting the positive electrode tab portions 4c to the positive electrode collector 6, or when force, caused by an impact or vibration, that moves the electrode body 3 is applied, load being applied to the connection between the collector body portion 6a of the positive electrode collector 6 and the deformation plate 42, the fragile portion provided in the collector body portion 6a, and the like can be suppressed.

The first through-hole 6y1 for fixing and the second through-hole 6y2 for fixing provided in the collector body portion 6a of the positive electrode collector 6 have an elongated shape extending along boundary lines of the collector body portion 6a and the collector connections 6b. With the above, load can be prevented from being applied to the fragile portion when bending the positive electrode collector 6. Furthermore, even if there is force created by an impact, vibration, or the like that makes the electrode body 3 pull or push up the lead portions 6c is applied, load can be prevented from being applied to the fragile portion provided in the collector body portion 6a of the positive electrode collector 6.

As illustrated in FIG. 15, the positive electrode collector 6 includes inclined portions 6x in the lead portions 6c. By providing the inclined portions 6x load being applied to the fragile portion provided in the collector body portion 6a of the positive electrode collector 6 can be suppressed. The inclined portions 6x are inclined with respect to the areas where the lead portions 6c are connected to the positive electrode tab portions 4c. The angle of inclination is preferably about 10 to 80°, or is preferably about 30 to 60°. Note that the negative electrode collector 8 includes inclined portions 8x in the lead portions 8c.

As illustrated in FIG. 14, in the direction perpendicular to the sealing plate 2, the distance between the sealing plate 2 and the lead portions 8c of the negative electrode collector 8 is larger than the distance between the sealing plate 2 and the lead portions 6c of the positive electrode collector 6. Such a configuration can reliably prevent the negative electrode collector 8 and the sealing plate 2 from coming in contact with each other. With the above, when the sealing plate 2 is made of aluminum or an aluminum alloy, the sealing plate 2 is electrically connected to the negative electrode and formation of a lithium alloy causing corrosion of the sealing plate 2 can be reliably prevented.

The negative electrode collector 8 has a structure that is different to that of the positive electrode collector 6. In the negative electrode collector 8, the collector connection 8b is provided at one of the end portions of the collector body 8a, and the pair of lead portions 8c are provided at the two ends of the single collector connection 8b. With such a configuration, the space occupied by the collector portion can be made smaller.

In the prismatic secondary battery 20, a current collecting structure is formed by disposing the resin member 60 holding the metal member 61 and the resin member 80 holding the metal member 81 between a power storing portion (a portion in which the positive electrode plates 4 and the negative electrode plates 5 are stacked with the separators in between) of the electrode body 3 and the sealing plate 2. Accordingly, the prismatic secondary battery becomes further higher in energy density. Furthermore, since assembling is facilitated and connection of the members can be performed more easily, the prismatic secondary battery becomes one with a high connection quality and high reliability. Note that it is only sufficient that a metal member and a resin member are provided on either one of the positive electrode side or the negative electrode side.

Furthermore, in the prismatic secondary battery 20, the resin member 60 holding the metal member 61 and the resin member 80 holding the metal member 81 are attached to the sealing plate 2. With such a configuration, the positive electrode tab portions 4c or the negative electrode tab portions 5c can be attached in a stable manner to the positive electrode collector 6 or the negative electrode collector 8 after the positive electrode collector 6 or the negative electrode collector 8 has been attached to the sealing plate 2 in advance. Accordingly, the quality of the connection between the positive electrode collector 6 and the electrode tab portions 4c or the quality of the connection between the negative electrode collector 8 and the negative electrode tab portions 5c becomes higher, and the prismatic secondary battery becomes further high in reliability.

The space required for the collector portion can be made smaller without the need for bending the positive electrode collector 6 or the negative electrode collector 8 after the positive electrode tab portions 4c or the negative electrode tab portions 5c have been connected to the positive electrode collector 6 or the negative electrode collector 8 by fixing the resin member 60 holding the metal member 61 or the resin member 80 holding the metal member 81 to the sealing plate 2 and by connecting the positive electrode collector 6 or the negative electrode collector 8 to the positive electrode tab portions 4c or the negative electrode tab portions 5c using the resin member 60 or the resin member 80. Accordingly, load applied to the positive electrode tab portions 4c or the negative electrode tab portions 5c due to bending or the like, and load applied to the connection portions between the positive electrode collector 6 or the negative electrode collector 8 and the positive electrode tab portions 4c or the negative electrode tab portions 5c can be suppressed. Accordingly, a highly reliable prismatic secondary battery having not only a high energy density but one in which damage and the like thereto are suppressed can be obtained.

Furthermore, in a case in which the current breaking mechanism 40 is provided between the positive electrode plates 4 and the positive electrode terminal 7, when the resin member 60 holding the metal member 61 is fixed to the sealing plate 2, even if there is force that moves the electrode body 3 inside the prismatic outer package 1, a load being applied to the connection between the deformation plate 42 and the positive electrode collector 6 and to the fragile portion provided in the positive electrode collector 6 can be suppressed. With the above, the prismatic secondary battery becomes more reliable.

The fixed portion between the resin member 60 and the sealing plate 2 is, desirably, disposed on the gas discharge valve 17 side with respect to the positive electrode terminal mounting hole 2a. Furthermore, the fixing portion between the resin member 60 and the sealing plate 2 is, desirably, disposed on the gas discharge valve 17 side with respect to the end portion of the deformation plate 42 on the gas discharge valve 17 side. Furthermore, the fixed portion between the resin member 80 and the sealing plate 2 is, desirably, disposed on the gas discharge valve 17 side with respect to the negative electrode terminal mounting hole 2b.

As illustrated in FIG. 14, the length of at least one of the resin member 60 and the resin member 80 in the direction perpendicular to the sealing plate 2 is, desirably, larger than the length from the surface of the sealing plate 2 on the inner side of the battery to the surface of the collector body portion 6a on the electrode body 3 side in the direction perpendicular to the sealing plate 2. With the above, even if the electrode body 3 were to move towards the sealing plate 2 side, the power storing portion of the electrode body 3 can be suppressed from coming into contact with the collector body portion 6a of the positive electrode collector 6, and damage in the connection between the collector body portion 6a of the positive electrode collector 6 and the deformation plate 42 or the fragile portion provided in the collector body portion 6a of the positive electrode collector 6 can be suppressed.

As illustrated in FIGS. 4 and 6, in the short direction of the sealing plate 2, the widths of the end portions of the resin member 60 and the resin member 80 on the electrode body 3 side become smaller from the sealing plate 2 side towards the electrode body 3 side. With the above, the positive electrode tab portions 4c or the negative electrode tab portions 5c can be prevented from becoming damaged by the resin member 60 or the resin member 80.

As illustrated in FIG. 14, the sealing plug 16 sealing the electrolyte injection hole 15 protrudes on the electrode body 3 side with respect to the surface of the sealing plate 2 on the inner side of the battery. Furthermore, the electrolyte injection hole 15 is formed between the gas discharge valve 17 and the negative electrode terminal mounting hole 2b. In order to obtain a sealing structure with a high durability, the sealing plug 16 is desirably made of metal. For example, the sealing plug 16 may be a blind rivet and may be made of aluminum or an aluminum alloy. In the prismatic secondary battery 20, the negative electrode tab portions 5c are divided into two and are bundled so as to be structured so that the sealing plug 16 and the negative electrode tab portions 5c do not come close to each other; accordingly, electrical connection between the negative electrode tab portion 5c and the sealing plug 16 can be prevented in a further reliable manner. Furthermore, since the prismatic secondary battery 20 is configured so that the resin member 80 is disposed at a portion opposing the sealing plug 16, electrical connection between the negative electrode tab portion 5c and the sealing plug 16 can be prevented in a further reliable manner. Note that in a case in which the sealing plug 16 is made of aluminum or an aluminum alloy, when the sealing plug 16 and the negative electrode tab portion 5c are electrically connected to each other, the sealing plug 16 is turned into a lithium alloy and may disadvantageously become corroded.

Description of modifications will be given below. Note that in the modifications, components that are the same as those of the prismatic secondary battery 20 described above are denoted with the same reference numerals as those of the prismatic secondary battery 20. Furthermore, portions that are not described in particular may each have the same configuration as that of the prismatic secondary battery 20 described above.

First Modification

In the prismatic secondary battery 20 described above, an example in which the positive electrode collector 6 and the positive electrode tab portions 4c are connected by resistance welding and in which the negative electrode collector 8 and the negative electrode tab portions 5c are connected by resistance welding has been given. Instead of resistance welding, the method of connecting the collector and the tab portions to each other may be, for example, laser welding in which the connection is performed through projection of a high energy ray. An example of a collector, a metal member, and a resin member that are suitable for welding through projection of a high energy ray is given below.

Figure 16:
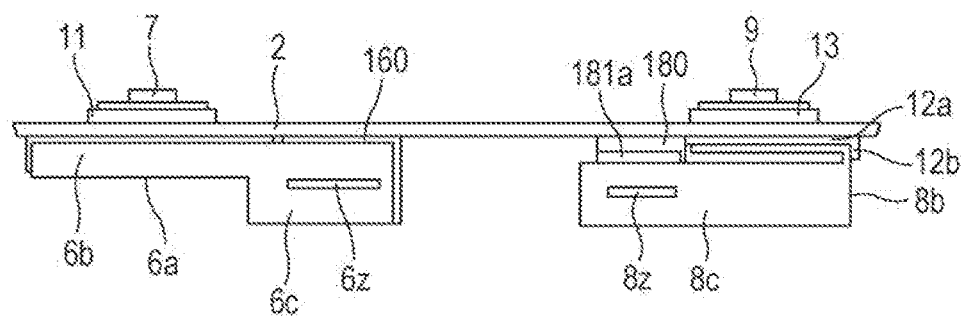
FIG. 16 is a side view of the sealing plate of the prismatic secondary battery according to a first modification to which the positive electrode collector and the negative electrode collector have been attached.

FIG. 16 is a diagram of a prismatic secondary battery according to a first modification, corresponding to FIG. 14. As illustrated in FIG. 16, a slit 6z is provided in each lead portion 6c of the pair of lead portions 6c of the positive electrode collector 6, and a slit 8z is provided in each lead portion 8c of the pair of lead portions 8c of the negative electrode collector 8. By projecting a high energy ray, such as a laser beam, on the edge portions of the slit 6z and the slit 8z, the lead portions 6c of the positive electrode collector 6 and the positive electrode tab portions 4c are welded to each other and the lead portions 8c of the negative electrode collector 8 and the negative electrode tab portions 5c are welded to each other.

Figure 17:
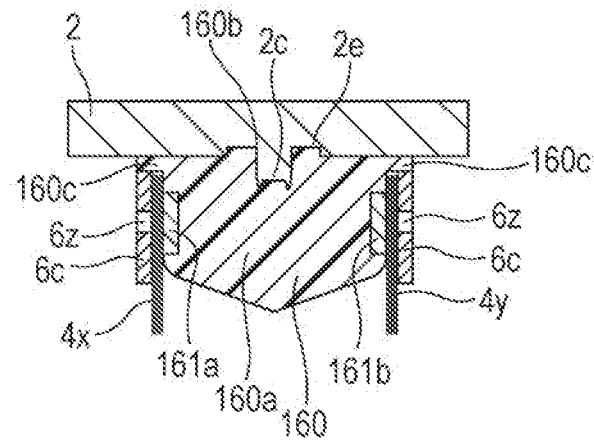
FIG. 17 is a cross-sectional view of the vicinity of a connection between lead portions of the positive electrode collector and the positive electrode tab portions of the prismatic secondary battery according to the first modification taken in the short direction of the sealing plate.

FIG. 17 is a cross-sectional view of the vicinity of the connection between the lead portions 6c of the positive electrode collector 6 and the positive electrode tab portions 4c of the prismatic secondary battery according to the first modification taken in the short direction of the sealing plate 2. A resin member 160 holds a first metal member 161a and a second metal member 161b in the surface on both sides thereof. The first metal member 161a and the second metal member 161b are each tabular and are disposed so as to be substantially parallel to the large-area side walls of the prismatic outer package 1. The resin member 160 includes a holding portion 160a that holds the first metal member 161a and the second metal member 161b, a fitting recess 160b, and a contact preventing portion 160c. The fitting recess 160b is fixed to the first fitting protrusion 2c of the sealing plate 2. The first positive electrode tab group 4x is welded to the first lead portions 6c while the first positive electrode tab group 4x is held between the first lead portions 6c and the first metal member 161a. Furthermore, the second positive electrode tab group 4y is welded to the second lead portions 6c while the second positive electrode tab group 4y is held between the second lead portions 6c and the second metal member 161b. Note that similar to the positive electrode side, a resin member 180 that holds the first metal member 181a and the second metal member is used in the negative electrode side.

Second Modification

Figure 18:
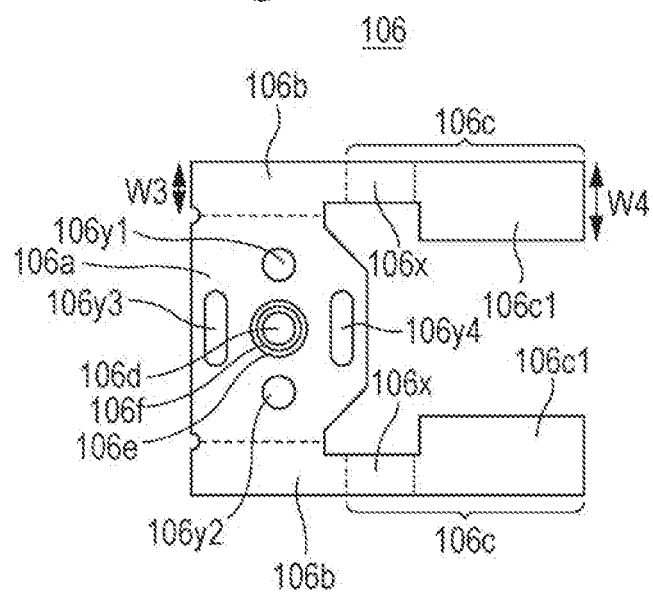
FIG. 18 is a plan view of the positive electrode collector before bending used in the prismatic secondary battery according to a second modification.

FIG. 18 is a plan view of a positive electrode collector 106 before bending used in a prismatic secondary battery according to a second modification, and illustrates a surface thereof on the electrode body 3 side. The positive electrode collector 106 includes a collector body portion 106a, a pair of collector connections 106b provided at the two ends in the short direction of the sealing plate 2) of the collector body portion 106a, and a pair of lead portions 106c that are each provided at the distal end side of the corresponding collector connection 106b. In the bent positive electrode collector 106, the collector connections 106b are disposed so as to extend towards the sealing plate 2 from the collector body portion 106a. In other words, the pair of collector connections 106b are bent with respect to the collector body portion 106a towards the far side in FIG. 18. Subsequently, the pair of lead portions 106c are each disposed so as to extend in the longitudinal direction of the sealing plate 2. A wide-width portion 106c1 that has a width (W4) that is wider than a width (W3) of the collector connection 106b is provided at a distal end side of each lead portion 106c.

A through-hole 106d for connection is formed in the collector body portion 106a, and a thin wall portion 106e is formed around the through-hole 106d for connection. Furthermore, an annular groove portion 106f is provided inside the thin wall portion 106e so as to surround the through-hole 106d for connection. Inclined portions 106x are provided in the lead portions 106c.

A first through-hole 106y1 for fixing, a second through-hole 106y2 for fixing, a third through-hole 106y3 for fixing, and a fourth through-hole 106y4 for fixing are provided in the collector body portion 106a. The third through-hole 106y3 for fixing and the fourth through-hole 106y4 for fixing each have a track shape. Note that the first projection 43d1, the second projection 43d2, the third projection 43d3, and the fourth projection 43d4 formed in the dielectric plate 43 may have shapes that correspond to the first through-hole 106y1 for fixing, the second through-hole 106y2 for fixing, the third through-hole 106y3 for fixing, and the fourth through-hole 106y4 for fixing, respectively.

Figure 19:
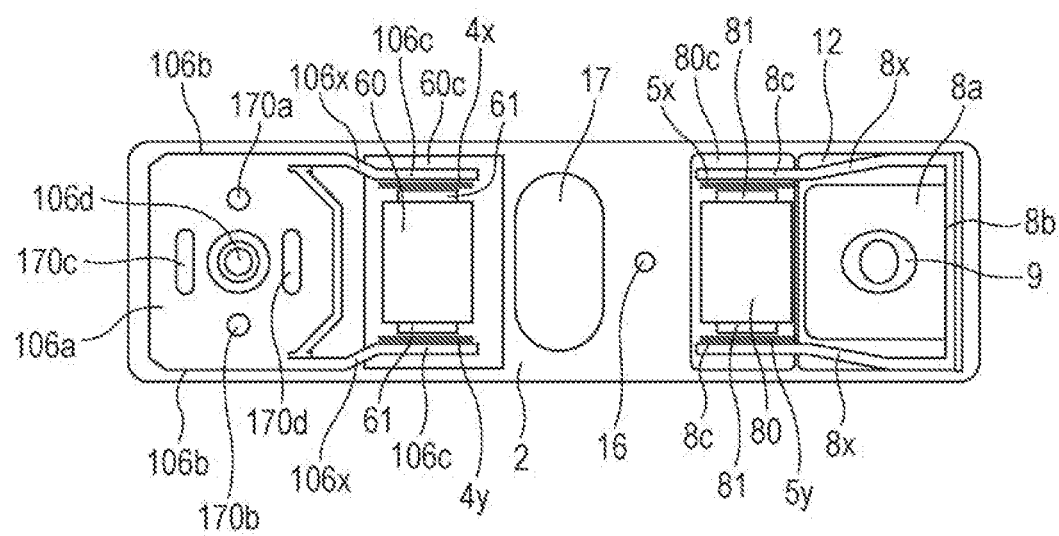
FIG. 19 is a diagram illustrating a surface on the battery inner side of the sealing plate of the prismatic secondary battery according to a first modification to which the positive electrode collector and the negative electrode collector have been attached.

FIG. 19 is a diagram of the prismatic secondary battery according to the second modification illustrating a surface of the sealing plate 2 on the inner side of the battery to which the positive electrode collector 106 and the negative electrode collector 8 are attached. As illustrated in FIG. 19, first fixed portion 170a to fourth fixed portion 170d are provided in the collector body portion 106a of the positive electrode collector 106. The collector body portion 106a of the positive electrode collector 106 is disposed parallel to the sealing plate 2. The collector connections 106b are disposed so as to extend towards the sealing plate 2 from the end portions of the collector body portion 106a. The lead portions 106c are disposed so as to extend in the longitudinal direction of the sealing plate 2 from the collector connections 106b. Resistance welding is performed while the first positive electrode tab group 4x is interposed between the metal member 61 and a first lead portion 106c, and while the second positive electrode tab group 4y is interposed between the metal member 61 and a second lead portion 106c. Note that in a case of welding using a projection of a high energy ray, desirably, a slit is provided in each lead portion 106c. Note that inclined portions 106x are provided in the lead portions 106c.

Third Modification

Figure 20:
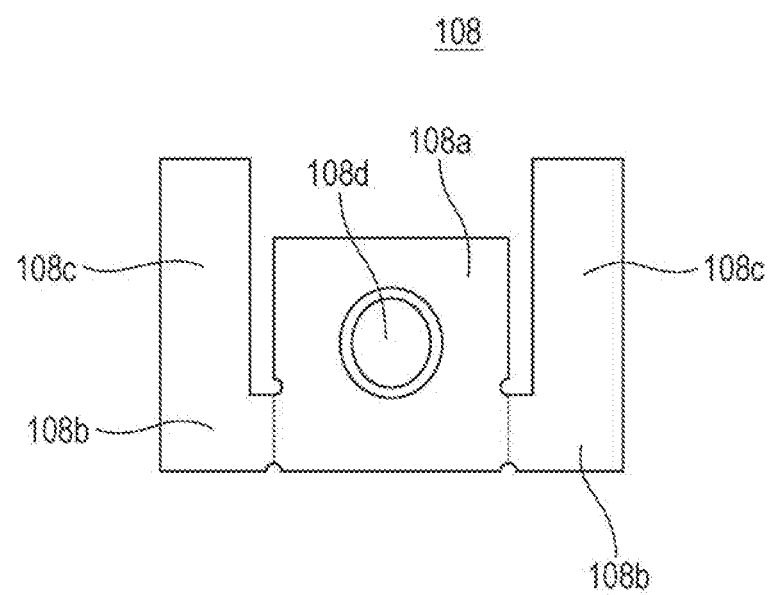
FIG. 20 is a plan view of the negative electrode collector before bending used in the prismatic secondary battery according to a third modification.

FIG. 20 is a plan view of a negative electrode collector 108 before bending used in the prismatic secondary battery according to the third modification, and illustrates the surface thereof on the electrode body 3 side. The negative electrode collector 108 includes a collector body portion 108a, a pair of collector connections 108b provided at two ends of the collector body portion 108a, and the pair of lead portions 108c provided in the pair of collector connections 108b. In the negative electrode collector 108 to which bending has been performed, the pair of collector connections 108b are disposed at both ends of the collector body portion 108a in the short direction of the sealing plate 2 so as to extend from the collector body portion 108a towards the electrode body 3. The pair of lead portions 108c are disposed so as to extend in the longitudinal direction of the sealing plate 2 from the pair of collector connections 108b. A through-hole 108d into which the negative electrode terminal 9 is inserted is provided in the collector body portion 108a.

Fourth Modification

In the prismatic secondary battery 20 described above, each lead portion 6c of the positive electrode collector 6 extends from the corresponding collector connection 6b towards, among the two end portions of the sealing plate 2 in the longitudinal direction, the end portion that is on the far side with respect to the positive electrode terminal 7 (the end portion on the right side in FIG. 15). Furthermore, in the longitudinal direction of the sealing plate 2, with respect to the collector body portion 6a, each lead portion 6c extends to a portion, among the two end portions of the sealing plate 2 in the longitudinal direction, on the end portion side, which is on the far side with respect to the positive electrode terminal 7. Conversely, each lead portion of the positive electrode collector may extend from the corresponding collector connection towards, among the two end portions of the sealing plate 2 in the longitudinal direction, the end portion that is on the near side with respect to the positive electrode terminal 7 (the end portion on the left side in FIG. 15). Furthermore, in the longitudinal direction of the sealing plate 2, with respect to the collector body portion, each lead portion may extend to a portion, among the two end portions of the sealing plate 2 in the longitudinal direction, on the end portion side, which is on the near side with respect to the positive electrode terminal 7. With such a configuration, it will be easy to connect the lead portions to the tab portions.

In the prismatic secondary battery according to the fourth modification, each lead portion of the positive electrode collector is extended from the corresponding collector connection towards, among the two end portions of the sealing plate in the longitudinal direction, the end portion that is on the near side with respect to the positive electrode terminal 7. In such a case, the position in the sealing plate 2 where the positive electrode terminal mounting hole 2a is provided is set more on the center side (the gas discharge valve 17 side). For example, the positive electrode terminal mounting hole 2a is provided at a position where the resin member 60 holding the metal member 61 is disposed in the prismatic secondary battery 20 described above. Furthermore, the position of the positive electrode tab portions 4c is set more on the outside in the longitudinal direction of the sealing plate 2. Subsequently, using the positive electrode collector disclosed in FIGS. 11 and 18, the collector body portion is positioned more on the center side and the lead portions are disposed more on the outside in the longitudinal direction of the sealing plate 2, then, the collector body portion and the deformation plate 42 may be connected to each other. In other words, the positive electrode collector of the prismatic secondary battery according to the fourth modification is disposed at a position rotated 180° in the horizontal direction with respect to the position in which the positive electrode collector of the prismatic secondary battery 20 described above is disposed.

Others

The method of connecting the positive electrode tab portions and the positive electrode collector to each other and the method of connecting the negative electrode tab portions and the negative electrode collector to each other are not limited to any method in particular and, for example, resistance welding, welding through projection of, for example, a high energy ray such as laser ultrasonic welding, or ultrasonic welding may be used.

The form of the electrode body is not limited to any particular form and may be either a wound electrode body, a stacked electrode body, or an electrode body including a plurality of wound electrode bodies.

Desirably, an overcharge inhibitor, which generates gas when the battery becomes overcharged, is included in the battery. In a case of a nonaqueous electrolyte secondary battery, desirably, lithium carbonate is included in the positive electrode active material layers or cyclohexylbenzene or the like is included in the nonaqueous electrolyte. Furthermore, desirably, lithium phosphate is contained in the positive electrode active material layers.

What is claimed is:

1. A prismatic secondary battery comprising:
    an electrode body that includes a positive electrode plate including a positive electrode tab portion, and a negative electrode plate including a negative electrode tab portion;
    an outer package that includes an opening and that houses the electrode body;
    a sealing plate that seals the opening;
    a terminal attached to the sealing plate, the terminal being electrically connected to the positive electrode plate or the negative electrode plate;
    a collector electrically connected to the positive electrode plate or the negative electrode plate; and
    a deformation plate provided in a conductive path between the positive electrode plate or the negative electrode plate and the terminal, the deformation plate being deformed when a pressure inside the battery becomes equivalent to or above a predetermined value,
    wherein the collector includes a collector body portion disposed on an electrode body side of the deformation plate, a collector connection that extends from the collector body portion towards the sealing plate, and a lead portion that extends from the collector connection towards one end portion of the sealing plate in a longitudinal direction of the sealing plate,
    wherein, in the longitudinal direction of the sealing plate, an end portion of the lead portion on one end portion side of the sealing plate in the longitudinal direction of the sealing plate is positioned on one end portion side of the lead portion in the longitudinal direction of the sealing plate with respect to an end portion of the collector body portion on the one end portion side of the sealing plate in the longitudinal direction of the sealing plate,
    wherein the collector body portion is connected to the deformation plate,
    wherein the positive electrode tab portion or the negative electrode tab portion is connected to the lead portion, and
    wherein the conductive path is cut off upon deformation of the deformation plate.

2. The prismatic secondary battery according to claim 1, wherein, in the collector body portion, a fragile portion is formed around a connection between the collector body portion and the deformation plate,
    wherein the fragile portion is broken upon deformation of the deformation plate such that the conductive path is cut off.

3. The prismatic secondary battery according to claim 1,
wherein the collector includes a pair of the lead portions, and each of the lead portions is connected to the positive electrode tab portion or the negative electrode tab portion.

4. The prismatic secondary battery according to claim 1,
wherein in the longitudinal direction of the sealing plate, one end portion of the sealing plate in the longitudinal direction of the sealing plate is an end portion on a far side with respect to the terminal.

5. The prismatic secondary battery according to claim 1,
wherein a through-hole for fixing in which a length thereof is larger than a width thereof is formed in the collector body portion,
wherein the through-hole for fixing is disposed so as to extend along a border line between the collector body portion and the collector connection,
wherein a first insulating member is disposed between the deformation plate and the collector body portion,
wherein the first insulating member includes a projection for fixing, and
wherein the projection for fixing is fitted to the through-hole for fixing.

6. The prismatic secondary battery according to claim 1,
wherein the collector is a positive electrode collector electrically connected to the positive electrode plate,
wherein a negative electrode collector electrically connected to the negative electrode plate includes
   a negative electrode collector body portion disposed parallel to the sealing plate,
   a negative electrode collector connection extending from an end portion of the negative electrode collector body portion in a longitudinal direction of the sealing plate towards the electrode body side, and
   a pair of negative electrode lead portions that extend from two ends of the negative electrode collector connection towards a middle of the sealing plate in the longitudinal direction of the sealing plate, and
wherein a negative electrode tab portion is connected to each of the pair of negative electrode lead portions.

\* \* \* \* \*